A. P. COCHRANE.
CORNER PIECE.
APPLICATION FILED AUG. 6, 1917.
1,320,205. Patented Oct. 28, 1919.
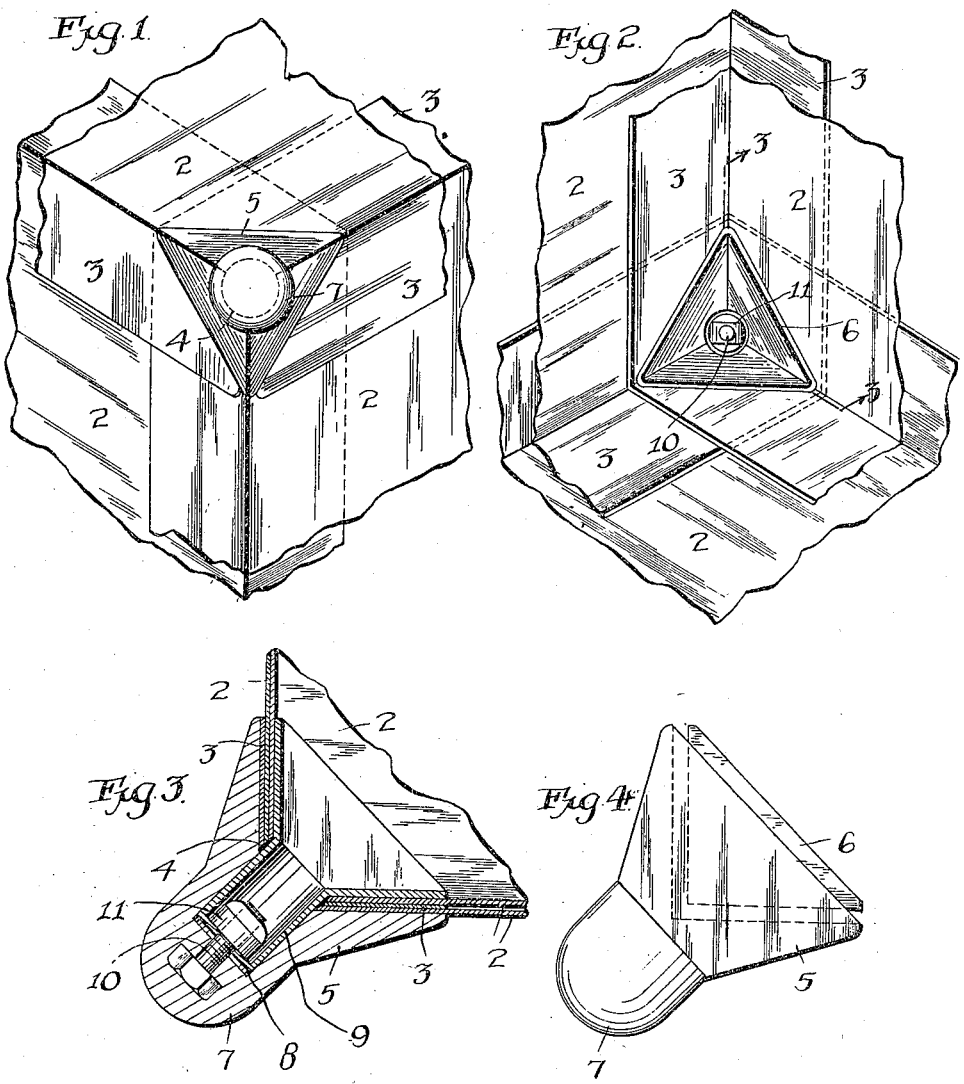
Inventor
A. P. Cochrane
By his Attorney

UNITED STATES PATENT OFFICE.

ALBERT PAUL COCHRANE, OF BROOKLYN, NEW YORK, ASSIGNOR TO HERVEY, BARBER & McKEE, OF NEW YORK, N. Y., A FIRM COMPOSED OF EVERETT P. HERVEY, ARTHUR WILLIAM BARBER, AND LANIER McKEE.

CORNER-PIECE.

1,320,205.  Specification of Letters Patent.  Patented Oct. 28, 1919.

Application filed August 6, 1917. Serial No. 184,580.

*To all whom it may concern:*

Be it known that I, ALBERT PAUL COCHRANE, a citizen of the United States, and a resident of the borough of Brooklyn, in the county of Kings and city and State of New York, have invented a new and useful Corner-Piece, of which the following is a specification.

The invention is an improvement in corner pieces, more particularly for containers such as disclosed in my prior Patent 1,195,908 of August 22, 1916, the present object being to provide a corner piece or fastening which is operable from the interior and is substantially flush with the inside of the box.

In the accompanying drawings:

Figure 1 is an outside perspective view of an apical corner of a knock-down container equipped with one of the fastenings;

Fig. 2 is an inside view of the same;

Fig. 3 is a section on the line 3—3 of Fig. 2; and

Fig. 4 is an elevation of the fastening removed.

The fragmentary portions of three sides or walls 2 meeting at the apical corner may be understood to represent the separate wall sections contemplated by my patent aforesaid, the same being provided with inturned flanges 3 at the edges and with registering or complementary openings 4 at the extreme corners.

The fastening comprises outer and inner virtually pyramidal members 5 and 6, each bearing upon the three intersecting planes. The outer member is preferably a casting of some mass, having a pyramidal concavity to fit the outside corner of the container, and its apical portion prolonged outward to form a rounded buffer and skidding boss 7. A recess 8, preferably of cylindrical form, extends outward from the apical region of the concavity into this boss.

The inner member is hollow, and preferably of sheet metal, being thus flat-webbed so as to lie flatly in the interior angle, and it is formed with a hollow apical protuberance 9 to enter the recess 8.

Means are provided, accessible from within, for uniting and permitting separation of the members 5 and 6, which means under the present invention is accommodated within the portions of the members outside the box, thereby avoiding obstruction of the interior. In the particular construction illustrated a bolt 10 is cast into the boss or apical portion of the outer member, with its threaded shank projecting into the recess 8, wherein it terminates. A nut 11 applied to this shank bears against the end wall of the hollow protuberance 9, which is perforated to permit the passage of the bolt, and thus draws the members 5 and 6 together and against the walls between. The protuberance 9 and recess 8 are preferably of such relative length that the former does not bottom in the latter before the pyramidal faces have applied clamping pressure to the walls.

What I claim as new is:

1. A corner piece comprising outer and inner virtually pyramidal members, having outwardly disposed engaging apical portions, and clamping means operable from the interior and contained within the engaging portions of the members outside of the corner.

2. A corner-piece for clamping walls in angular relation, comprising an outer clamping member adapted to be applied to the outer angle of the walls to be secured and having a corner recess outside said angle, an inner flat-webbed angular clamping member formed to fit flatly in the inner angle of the walls and having a hollow corner protuberance to enter the recess of the outer member, and screw clamping means operable from within and accommodated in said hollow protuberance.

3. An apical corner piece for knockdown structures, comprising virtually pyramidal outer and inner members, the inner member having a hollow apical protuberance and the outer member a recess to receive said protuberance, and screw clamping means operable from within and accommodated in said hollow protuberance.

ALBERT PAUL COCHRANE.

Copies of this patent may be obtained for five cents each, by addressing the "Commissioner of Patents, Washington, D. C."